United States Patent
Barrese et al.

(10) Patent No.: US 11,250,413 B2
(45) Date of Patent: Feb. 15, 2022

(54) PAYMENT PROCESSING APPARATUS

(71) Applicant: PAYPAL, INC., San Jose, CA (US)

(72) Inventors: James Barrese, San Jose, CA (US); Manish Maheshwari, Los Altos, CA (US); Rohan Sehgal, San Jose, CA (US); Amit Paka, Mountain View, CA (US); Sunil Nair, San Jose, CA (US); Suket Somani, San Jose, CA (US); Barath Rangaswamy, San Jose, CA (US); Vidhi Himanshu Shah, Santa Clara, CA (US); Weijie Li, Milpitas, CA (US)

(73) Assignee: PayPal, Inc., San Jose, CA (US)

(*) Notice: Subject to any disclaimer, the term of this patent is extended or adjusted under 35 U.S.C. 154(b) by 209 days.

(21) Appl. No.: 16/505,024

(22) Filed: Jul. 8, 2019

(65) Prior Publication Data
US 2020/0042976 A1    Feb. 6, 2020

Related U.S. Application Data

(63) Continuation of application No. 14/934,813, filed on Nov. 6, 2015, now Pat. No. 10,346,828.

(60) Provisional application No. 62/076,667, filed on Nov. 7, 2014.

(51) Int. Cl.
*G06Q 20/40* (2012.01)
*G06Q 20/32* (2012.01)
*G06Q 20/38* (2012.01)
*G06Q 20/20* (2012.01)

(52) U.S. Cl.
CPC ....... *G06Q 20/3274* (2013.01); *G06Q 20/204* (2013.01); *G06Q 20/3224* (2013.01); *G06Q 20/3227* (2013.01); *G06Q 20/385* (2013.01)

(58) Field of Classification Search
CPC .............................. G06Q 20/40; G06Q 20/32
See application file for complete search history.

(56) References Cited

U.S. PATENT DOCUMENTS

| | | | |
|---|---|---|---|
| 8,930,271 B1 | 1/2015 | Ellis et al. | |
| 2013/0159186 A1* | 6/2013 | Brudnicki | H04W 12/068 705/44 |
| 2013/0246282 A1 | 9/2013 | Carrott | |
| 2014/0249968 A1* | 9/2014 | MacKinnon Keith | G06Q 20/3276 705/26.82 |

(Continued)

*Primary Examiner* — Edward Chang
(74) *Attorney, Agent, or Firm* — Haynes and Boone, LLP

(57) ABSTRACT

A payment processing apparatus and a system or a method are provided that have a location-agnostic payment code, where the user does not have to check in to the merchant's location. Further, the reliance on the network connection is reduced by caching or storing payment codes at the user's mobile device. The payment codes may have expiration and may be used once. The payment codes may be revoked or canceled if the user's mobile device is compromised or stolen. In an embodiment, the payment codes may be generated and provided to the user's mobile device when the payment application at the user's mobile device is refreshed. For example, the payment application is refreshed based on user's payment history or payment habits. In another embodiment, the payment codes may be generated and provided to the user's mobile device when the user is within a predetermined distance from a merchant.

20 Claims, 11 Drawing Sheets

(56) References Cited

U.S. PATENT DOCUMENTS

2015/0254635 A1* 9/2015 Bondesen ............ G06Q 20/36
　　　　　　　　　　　　　　　　　　　　705/41

* cited by examiner

PAYMENT PROCESSING APPARATUS

CROSS REFERENCE TO RELATED APPLICATION

This application is a continuation of U.S. patent application Ser. No. 14/934,813, filed Nov. 6, 2015, which claims priority to the filing date of U.S. Provisional Patent Application Ser. No. 62/076,667, filed Nov. 7, 2014, all of which are incorporated by reference in their entirety.

BACKGROUND

Field of the Invention

The present invention generally relates to a payment processing apparatus and, and in particular, systems and methods for implementing payment processing.

Related Art

With the popularity of mobile devices, such as smart phones, customers are utilizing their smart phones to perform various functions besides making phone calls. For example, customers may utilize their mobile devices to make payments at various merchants. However, a customer typically is required to implement a series of steps or operations on the mobile device to make payments at merchant locations. This may cause inconvenience to the user and may discourage the user from using the mobile device to make payments. Thus, there is a need for a better apparatus or system for making payments at merchant locations.

Figure 1:
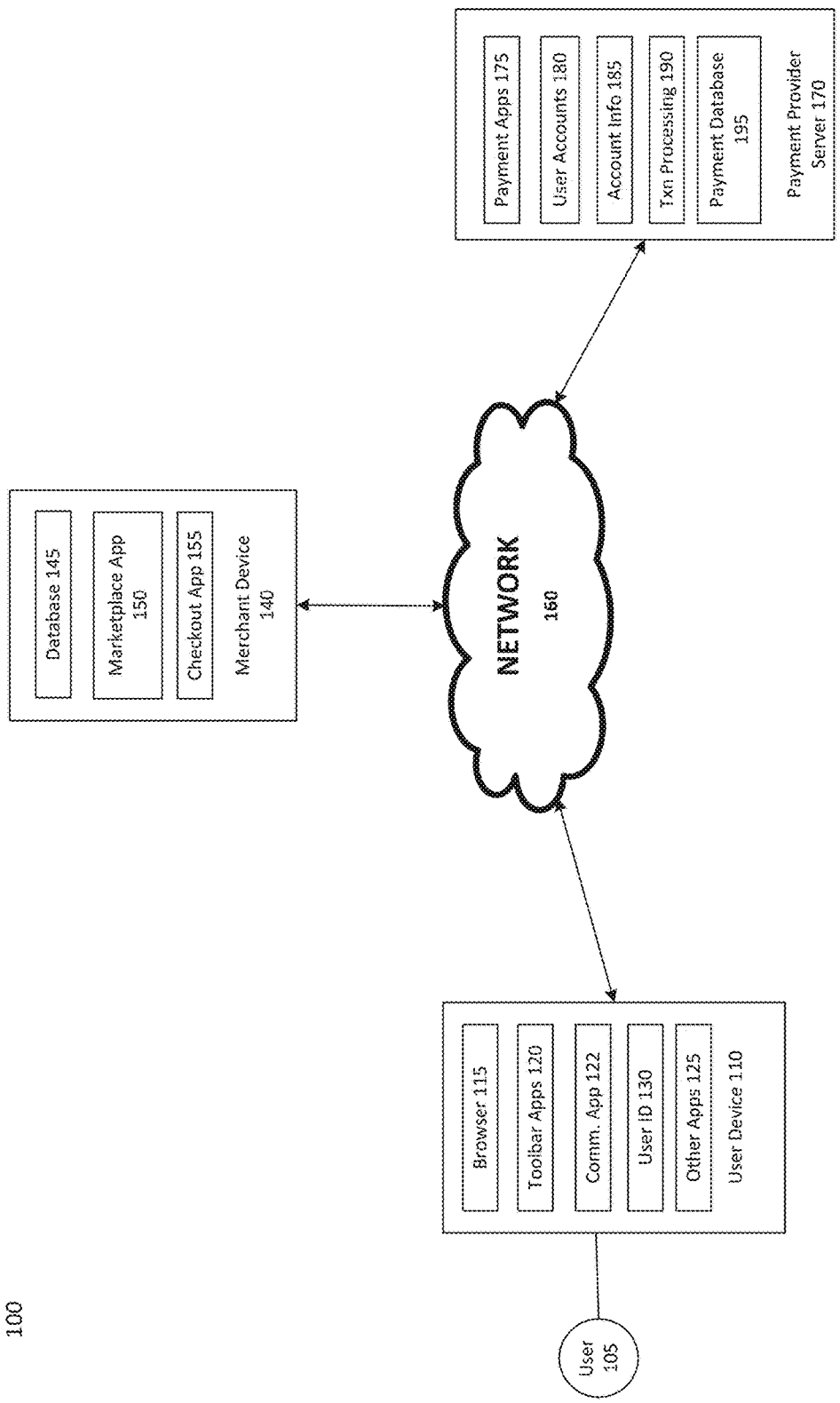
FIG. 1 is a block diagram of a networked system suitable for implementing payment processing according to an embodiment.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

Users may utilize their mobile device, such as their smart phones, to make payments at a Point of Sale (POS) of a merchant. Typically, a user may first check in to the merchant's location or store using the mobile device. The mobile device then may obtain a pay code from a payment service provider, such as PayPal, Inc. The user may use the pay code to make payments at the merchant. However, this process of obtaining the pay code to make a payment requires multiple operations and steps at the user's mobile device. For example, the user may need to check in at the merchant first before obtaining the pay code. Further, when network connection at the user's mobile device is weak or not available at the merchant's location, the user may not be able to check in to the merchant's store or obtain the pay code from the payment service provider.

According to an embodiment, a payment processing apparatus and a system or method are provided that have a location-agnostic payment code, where the user does not have to check in to the merchant's location. Further, the reliance on the network connection is reduced by caching or storing payment codes at the user's mobile device. The payment codes may have expiration dates and/or times and may be used once. The payment codes may be revoked or canceled if the user's mobile device is compromised or stolen. For example, the payment codes may be erased or deleted from the user's mobile device after a certain number of failed login attempts or if the user's mobile device is in a new or unfamiliar location.

In some embodiments, the payment codes may be hidden from display or not accessible by the user based on the user's location/movement. For example, when the user is not near any participating merchants, the payment codes may be hidden or non-accessible to the user through a pull-down notification center of the user's mobile device. The payment codes may become visible or accessible when the user approaches or is at a participating merchant location.

In an embodiment, the payment codes may be generated and provided to the user's mobile device when the payment application at or stored on the user's mobile device is refreshed. For example, the payment application is refreshed based on the user's payment history or payment habits. In another embodiment, the payment codes may be generated and provided to the user's mobile device when the user is within a predetermined distance of a merchant location. The predetermined distance may differ based on the type of merchant.

In an embodiment, the payment codes may be generated and provided to the user's mobile device when the user performs a certain gesture using the user's mobile device, such as shaking the user's mobile device. The gesture that triggers payment code generation may be defined by the user. As such, the user may define unique and user customized gestures for generating payment codes.

FIG. 1 is a block diagram of a networked system 100 suitable for implementing a payment process using payment codes according to an embodiment. Networked system 100 may comprise or implement a plurality of servers and/or software components that operate to perform various payment transactions or processes. Exemplary servers may include, for example, stand-alone and enterprise-class servers operating a server OS such as a MICROSOFT® OS, a UNIX® OS, a LINUX® OS, or other suitable server-based OS. It can be appreciated that the servers illustrated in FIG. 1 may be deployed in other ways and that the operations performed and/or the services provided by such servers may be combined or separated for a given implementation and may be performed by a greater number or fewer number of servers. One or more servers may be operated and/or maintained by the same or different entities.

System 100 may include a user device 110, a merchant device 140 (merchant server), and a payment provider server 170 in communication over a network 160. Payment provider server 170 may be maintained by a payment service provider, such as PayPal, Inc. of San Jose, Calif. A user 105, such as a sender or consumer, utilizes user device 110 to perform a transaction using payment provider server 170. User 105 may utilize user device 110 to initiate a payment transaction, receive a transaction approval request, or reply to the request. Note that transaction, as used herein, refers to any suitable action performed using the user device, including payments, transfer of information, display of information, etc. For example, user 105 may utilize user device 110 to initiate a deposit into a savings account. Although only one merchant server is shown, a plurality of merchant servers may be utilized if the user is purchasing products or services from multiple merchants.

In some embodiments, payment provider server 170 may issue payment codes to the user device 110. The user device 110 may then provide the payment code to the merchant at a POS of the merchant to make payment. The merchant may then scan or receive the payment code from the user device 110 and may confirm the payment code with the payment provider server 170. The payment provider server 170 may verify the payment code and may process payment from the user 105 to the merchant.

The payment codes may include encoded information and may be associated with the user 105's payment account at the payment service provider. In an embodiment, the payment code is in a Quick Response (QR) code. In other embodiments, the payment code may be a series of numbers and/or characters, a bar code, or any other readable or scannable code.

User device 110, merchant server 140, and payment provider server 170 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 100, and/or accessible over network 160. Network 160 may be implemented as a single network or a combination of multiple networks. For example, in various embodiments, network 160 may include the Internet or one or more intranets, landline networks, wireless networks, and/or other appropriate types of networks.

User device 110 may be implemented using any appropriate hardware and software configured for wired and/or wireless communication over network 160. For example, in one embodiment, user device 110 may be implemented as a personal computer (PC), a smart phone, wearable device, laptop computer, and/or other types of computing devices capable of transmitting and/or receiving data, such as an iPad™ from Apple™.

User device 110 may include one or more browser applications 115 which may be used, for example, to provide a convenient interface to permit user 105 to browse information available over network 160. For example, in one embodiment, browser application 115 may be implemented as a web browser configured to view information available over the Internet, such as a user account for setting up a shopping list and/or merchant sites for viewing and purchasing products and services. User device 110 may also include one or more toolbar applications 120 which may be used, for example, to provide client-side processing for performing desired tasks in response to operations selected by user 105. In one embodiment, toolbar application 120 may display a user interface in connection with browser application 115.

User device 110 may further include other applications 125 as may be desired in particular embodiments to provide desired features to user device 110. For example, other applications 125 may include security applications for implementing client-side security features, programmatic client applications for interfacing with appropriate application programming interfaces (APIs) over network 160, or other types of applications.

Applications 125 may also include email, texting, voice and IM applications that allow user 105 to send and receive emails, calls, and texts through network 160, as well as applications that enable the user to communicate, transfer information, make payments, and otherwise utilize a smart wallet through the payment provider as discussed above. User device 110 includes one or more user identifiers 130 which may be implemented, for example, as operating system registry entries, cookies associated with browser application 115, identifiers associated with hardware of user device 110, or other appropriate identifiers, such as used for payment/user/device authentication. In one embodiment, user identifier 130 may be used by a payment service provider to associate user 105 with a particular account maintained by the payment provider. A communications application 122, with associated interfaces, enables user device 110 to communicate within system 100.

User device 110 may include location detection devices, such as Global Positioning System (GPS) devices, configured to detect a location of the user device 110. User device 110 may include a Bluetooth device configured to implement low energy Bluetooth (BLE) communication. For example, user device 110 may detect various low energy Bluetooth signals from Bluetooth beacons installed in a merchant's store. Thus, locations and movements of user device 110 may be determined by positioning techniques, such as triangulation or location fingerprinting. User device 110 also may include various sensors, such as gyroscope, accelerometer, and the like, that are configured to detect a movement and motion experienced by the user device 110.

Merchant server 140 may be maintained, for example, by a merchant or seller offering various products and/or services. The merchant may have a physical point-of-sale (POS) store front. The merchant may be a participating merchant who has a merchant account with the payment service provider. Merchant server 140 may be used for POS or online purchases and transactions. Generally, merchant server 140 may be maintained by anyone or any entity that receives money, which includes charities as well as banks and retailers. For example, a payment may be a donation to charity or a deposit to a saving account. Merchant server 140 may include a database 145 identifying available products (including digital goods) and/or services (e.g., collectively referred to as items) which may be made available for viewing and purchase by user 105. Accordingly, merchant server 140 also may include a marketplace application 150 which may be configured to serve information over network 160 to browser 115 of user device 110. In one embodiment, user 105 may interact with marketplace application 150 through browser applications over network 160 in order to view various products, food items, or services identified in database 145.

Merchant server 140 also may include a checkout application 155 which may be configured to facilitate the purchase by user 105 of goods or services online or at a physical POS or store front. Checkout application 155 may be configured to accept payment information from or on behalf of user 105 through payment service provider server 170 over network 160. For example, checkout application 155 may receive and process a payment confirmation from payment service provider server 170, as well as transmit transaction information to the payment provider and receive information from the payment provider (e.g., a transaction ID). Checkout application 155 may be configured to receive payment via a plurality of payment methods including cash, credit cards, debit cards, checks, money orders, or the like. Merchant server 140 also may include a reader or a scanner configured to read or scan payment codes from the user device 110. For example, the merchant server 140 may include an optical scanner at the POS of the merchant to scan payment codes displayed on user 105's user device 110 to process payment.

Payment provider server 170 may be maintained, for example, by an online payment service provider which may provide payment between user 105 and the operator of merchant server 140. In this regard, payment provider server 170 includes one or more payment applications 175 which may be configured to interact with user device 110 and/or merchant server 140 over network 160 to facilitate the purchase of goods or services, communicate/display information, and send payments by user 105 of user device 110.

Payment provider server 170 also maintains a plurality of user accounts 180, each of which may include account information 185 associated with consumers, merchants, and funding sources, such as banks or credit card companies. For example, account information 185 may include private financial information of users of devices such as account numbers, passwords, device identifiers, user names, phone numbers, credit card information, bank information, or other financial information which may be used to facilitate online transactions by user 105. Advantageously, payment application 175 may be configured to interact with merchant server 140 on behalf of user 105 during a transaction with checkout application 155 to track and manage purchases made by users and which and when funding sources are used.

A transaction processing application 190, which may be part of or separate from payment application 175, may be configured to receive information from user device 110 and/or merchant server 140 for processing and storage in a payment database 195. Transaction processing application 190 may include one or more applications to process information from user 105 for processing an order and payment using various selected funding instruments, including for initial purchase and payment after purchase as described herein. As such, transaction processing application 190 may store details of an order from individual users, including funding source used, credit options available, etc. Payment application 175 may be further configured to determine the existence of and to manage accounts for user 105, as well as create new accounts if necessary.

Payment provider server 170 may generate and issue payment codes to the user device 110. The payment codes may be used by the user 105 to make payments at various merchants. The payment codes may be unique codes associated with the user 105's payment account at the payment service provider. The payment codes each may have an expiration. As such, the payment codes may expire after a certain period of time. The payment codes may be one-time use codes that may be used for one payment transaction. In another embodiment, the payment codes may be used for a predetermined number of times before they expire. The payment codes may be cached or stored at the user device 110 ready to be used. The user device 110 may store a certain number of payment codes at once, such as five payment codes. The payment provider server 170 may continuously update and refresh the payment codes cached at the user device 110 as the payment codes expire or are used up at the user device 110.

Figure 2:
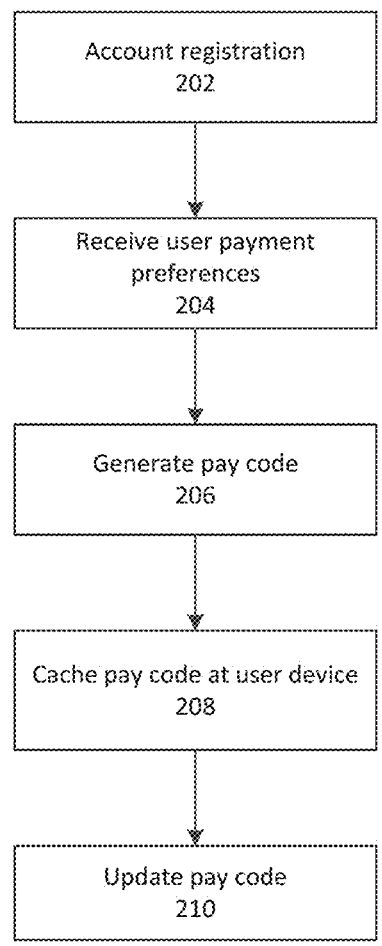
FIG. 2 is a flowchart showing a process for setting up a payment account for payment processing according to one embodiment.

FIG. 2 is a flowchart showing a set up process 200 for a payment process with payment codes according to one embodiment. At step 202, payment provider server 170 may register user 105 by setting up a payment account at the payment service provider. User 105 may provide payment service provider with various personal and financial information, such as name, contact information, funding sources, and the like. In particular, user 105 may use user device 110 to download a payment application from the payment provider server 170. The payment application may allow the user to implement and manage various payment transactions using the user device 110.

At step 204, the payment provider server 170 or the user device 110 may receive user 105's payment preferences. For example, the user 105 may choose whether to allow payment using payment codes. The user 105 may be allowed to choose how and when the payment codes are generated or refreshed, such as based on the user device 110's proximity to a merchant or based on the user 105's gesture using the user device 110 (e.g., shaking the user device 110). In other embodiments, the payment codes may be refreshed or generated based on the user 105's payment habits or routines or based on user 105's schedule or calendar.

At step 206, the payment provider server 170 may generate payment codes. The payment codes may be unique codes associated with the user 105's payment account. The payment codes may be one or more of a QR code, a bar code, a series of codes including numbers and/or characters, an image, an audio signal, and the like. The payment provider server 170 may generate multiple payment codes to be stored at the user device 110.

Figure 11:
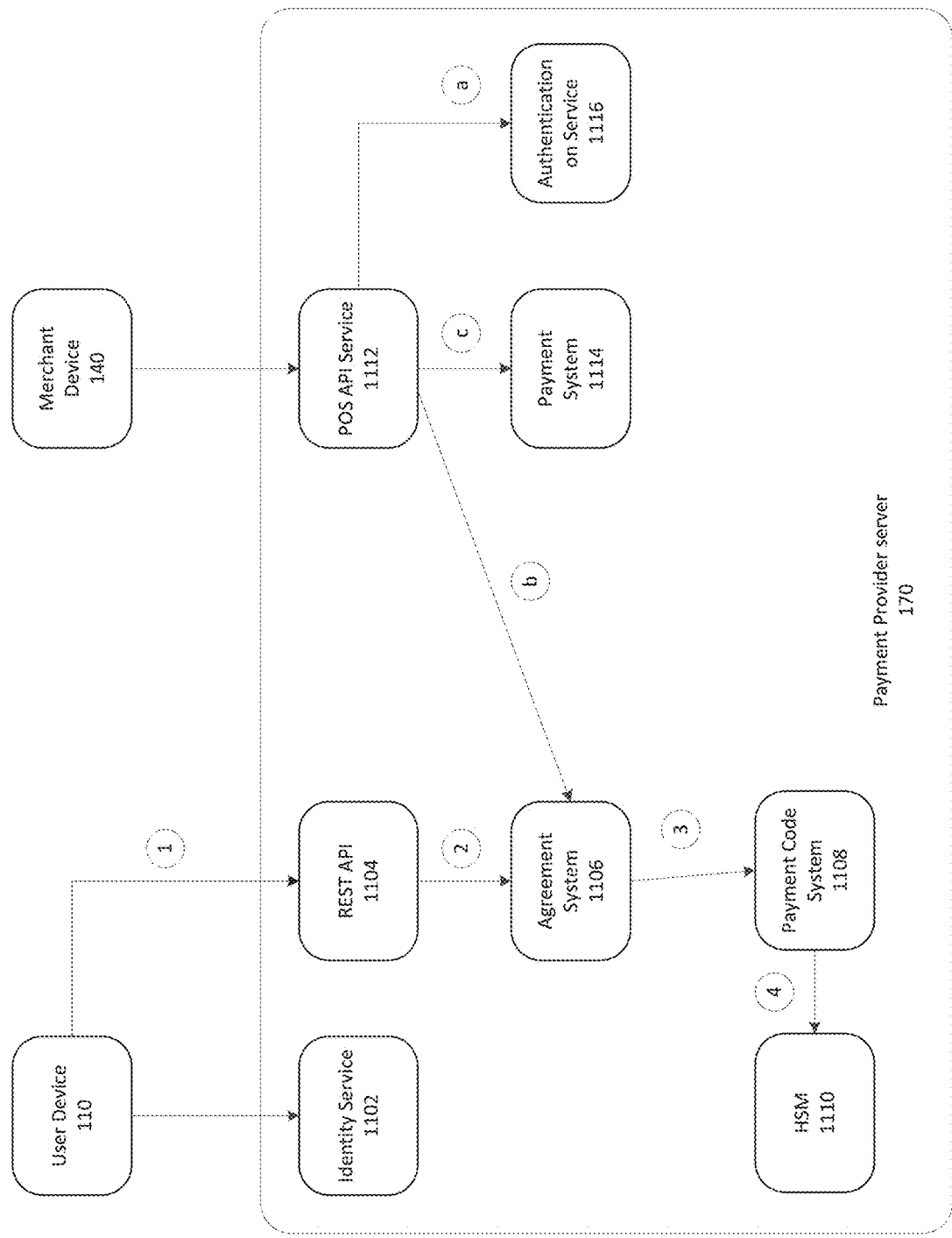
FIG. 11 is a flowchart illustrating a process for generating and using payment codes.

FIG. 11 is a flowchart illustrating a process for generating payment codes. As shown in FIG. 11, the user device 110 may have a mobile payment app that may communicate and interact with an identity service 1102 at the payment provider server 170 to authenticate the user. For example, the user may enter a user ID and password at the user device 110 that may be communicated to the identity service 1102 to be verified with the user ID and password on record with the user 105's payment account. The user 105 may be authenticated by other means, such as by one or more of the user's facial features (as captured by a camera of the user device 110), the user's biometric data (as detected by biometric sensors of the user device 110, such as hear beat, body temperature, and the like), the user's voice, the user's finger print (as scanned by a finger print scanner on the user device 110), the user's location history, travel history, location, and the like.

A request for creating a payment code may be transmitted from the mobile payment app of the user device 110 to a Representational State Transfer (REST) API 1104 at the payment service provider. The REST API 1104 may be configured to communicate over Hypertext Transfer Protocol (HTTP) that is used by web browsers to retrieve and send data. A virtual token may be created. The virtual token may be validated with the agreement and constraints of merchants at an agreement system 1106, such as conforming to the format, style, type, rules, as agreed upon between the merchant and the payment service provider. Payment code system 1108 may generate a payment code based on the virtual token. This may involve a Hardware Security Module (HSM) 1110 that is configured to safeguard and manage digital keys for strong authentication and provide crypto-processing, such as by generating a random number that is used for generating the payment code.

At step 208, the user device 110 may cache or store the payment codes received from the payment provider server 170 ready to be used for payments at merchant locations. The user device 110 may store up to a number of unique payment codes (e.g., five payment codes). The payment codes may expire based on their respective time limits. The payment codes may be one-time used payment codes each may be used once for payment transaction. In another embodiment, the payment codes may be used a certain number of times, such as five times, before they expire. In still another embodiment, the payment codes may be used for unlimited number of times.

At step 210, the payment codes may be updated. For example, as payment codes expire over time, the user device 110 may request new payment codes from the payment service provider. In an embodiment, as the payment codes expire over time, the user device 110 may request new payment codes from the payment service provider. In another embodiment, the payment codes may be updated based on the user 105's payment habits or routines. For example, the system may monitor the user 105's payment transactions/activities, and may determine certain routine payments, such as the user 105 paying for a cup of coffee every morning between 7:00 AM and 9:00 AM during week days at a particular coffee shop. The system may determine that the user 105 is very likely to make a payment to the same coffee shop every week day morning and may automatically provide or present the payment code at the user device 110, such as on a display of the user device 110, when the user 105 approaches the coffee shop on a week day morning.

In still another embodiment, the payment codes may be updated or generated based on the user 105's gesture using the user device 110. In some embodiments, the payment codes may be generated or refreshed based on the user 105's location relative to merchant locations, such as within 100 feet from certain merchant's POS. In other embodiments, the payment codes may be updated or refreshed based on the user device 110's network connection status. For example, the payment codes may be updated or refreshed when the user device 110 has adequate or good connection to the network 160. Thus, the payment codes may be updated and refreshed when the user device 110 has good connection or good cellular signal reception, such that the payment codes may be ready to be used even when the user device 110 is experiencing weak cellular signal reception or has limited connection to the network 160. "Good," "weak," or "adequate" may be set by the system, such based on the strength of connection needed to process a transaction through the user device 110.

Figure 9:
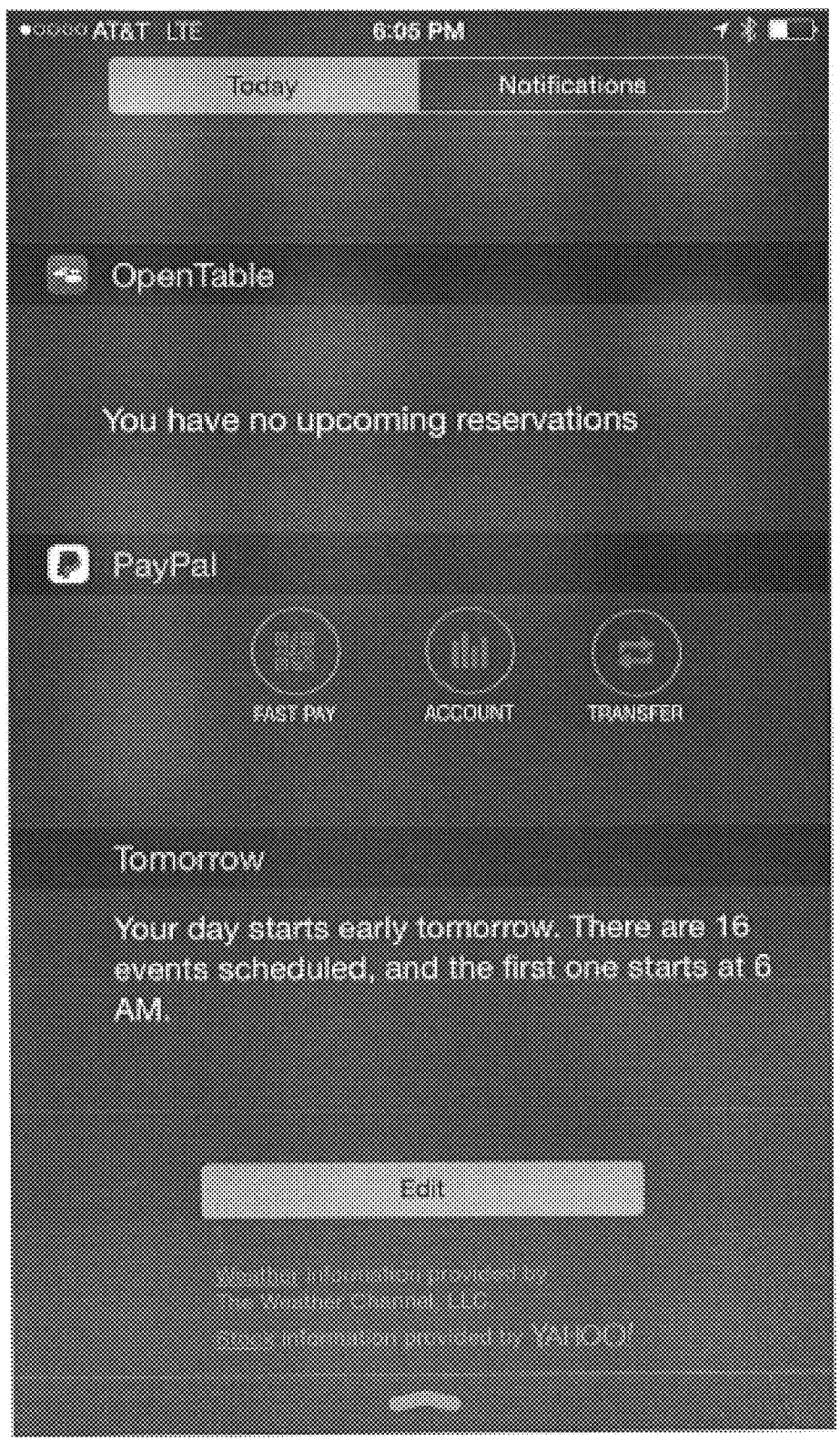
FIG. 9 is a diagram showing a screen shot of a user interface for payment processing according to one embodiment.
Figure 10:
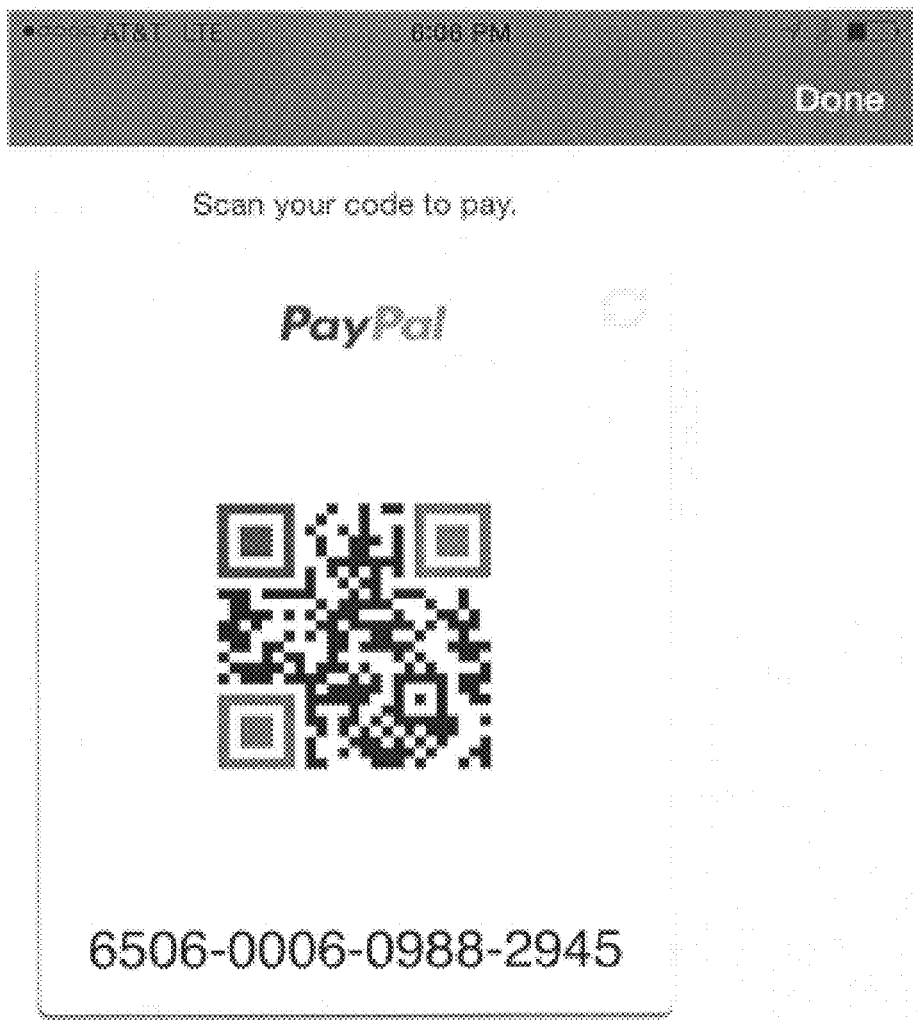
FIG. 10 is a diagram showing a screen shot of a user interface for payment processing according to one embodiment.

FIG. 11 also illustrates a process for using the payment codes at a merchant. When the user 105 is making a payment at a merchant location, the user 105 may use the user device 110 to display a payment code. In an embodiment, the user 105 may activate a mobile payment app which may allow the user 105 to access and display a payment code. In some embodiments, the user 105 may access a "Fast Pay" button provided directly in a Today menu of the APPLE's iOS, as shown FIG. 9. This allows the user 105 to quickly access and display a payment code. The user device 110 may select an available and/or valid payment code to be displayed. The payment code may be displayed, as a QR code, bar code, a character string, or the like, on the user device, 110, as shown in FIG. 10.

The merchant device 140 may include a scanner or reader configured to scan and/or read the payment code presented by the user 105 for payment. Referring now to FIG. 11, after receiving the payment code, the merchant device 140 may send a transaction message to a POS API service 1112 at the payment service provider. The transaction message may include the payment code, the identity of the merchant, purchase information, such as time, date, and location of purchase, products/services purchased, amount of payment, and the like. The POS API service 1112 may create a payment transaction session for the payment request. The payment code may be authenticated at an authentication on service 1116, which may include decrypting and validating the payment code. The POS API service 1112 also may validate payment code with the agreement system 1106 based on rules and constraints of the payment code, such as limits on number of transactions, types of transactions, expiration, and the like. If the payment code is verified and validated, a payment system 1114 may process a payment based on the payment request. For example, the payment system 1114 may debit the user 105's payment account and credit the merchant's account with the requested payment amount.

Figure 3:
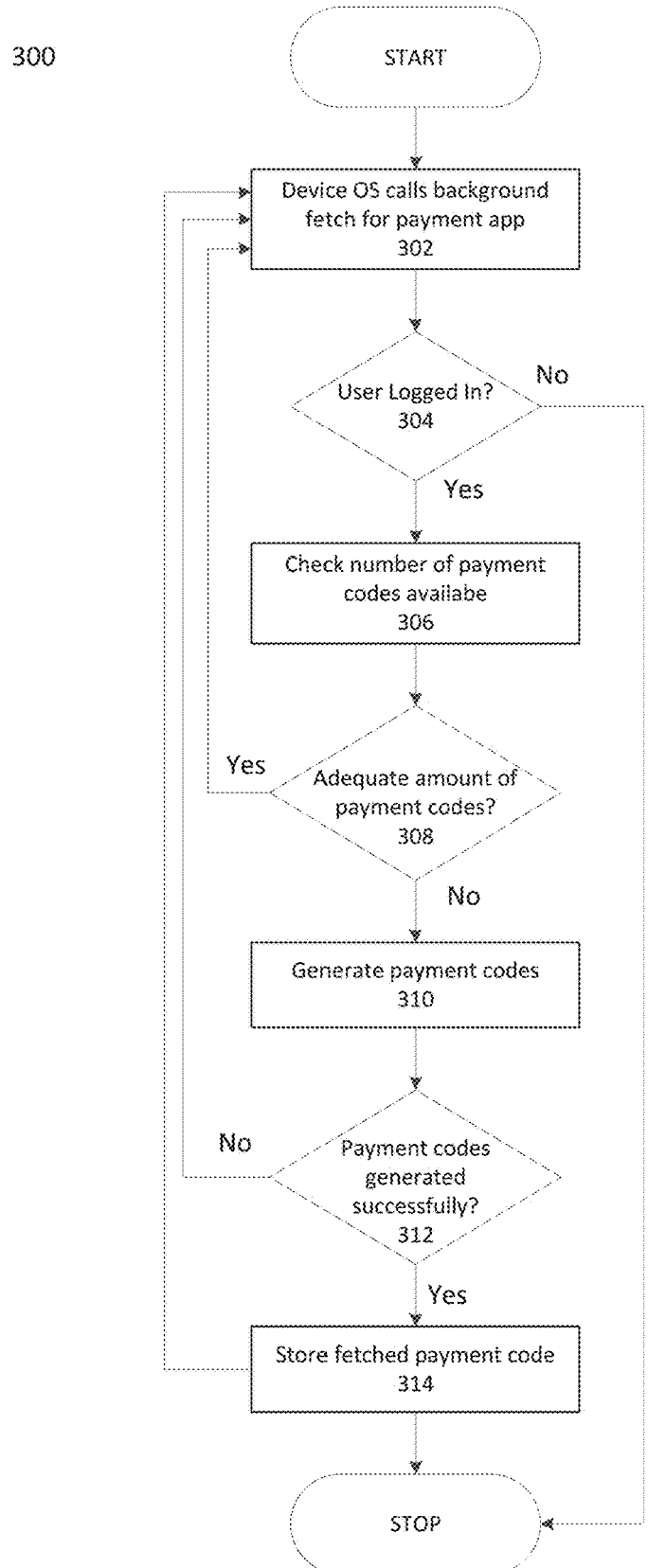
FIG. 3 is a flow chart showing a process for caching payment codes in accordance with one embodiment.

FIG. 3 is a flow chart showing a process 300 for caching payment codes in accordance with one embodiment. The process 300 may start when the operation system of the user device 110, e.g., APPLE iOS, calls for background fetch for the mobile payment application installed on the user device 110. The operation system may call a background fetch based on the user 105's usage history of the payment application. For example, the background fetch may occur based on the user 105's payment history, payment routine, or the like. Thus, the background fetch may occur at a time when the user 105 is likely about to use the payment application to make payments.

In some embodiments, the payment code fetching process may occur based on the location and/or movement of the user 105 as detected by a GPS or Bluetooth Low Energy (BLE) sensor of the user device 110. For example, if the user 105 is detected as approaching a merchant store or if the user 105 is detected as approaching a checkout counter at a merchant store, the system may automatically fetch and/or refresh the payment codes a the user device 110 in anticipation for a possible payment transaction at the merchant. In some embodiments, the system may perform the payment code fetching process based on the network connectivity of the user device 110. For example, the user device 110 may be located in an area in which network connectivity is weak, such as weak cellular signal reception or weak wireless network signal, as such the user device 110 may fetch and/or refresh payment codes whenever network connectivity is available or improves. Thus, the payment codes may be fetched or refreshed as soon as network connectivity is available and the payment codes may be refreshed and/or fetched and ready to be used even when network connectivity becomes unavailable.

In some embodiments, the payment code fetching process may occur in response to the user 105's request or user 105's operations of the user device 110. For example, the user 105 may use the mobile payment app on the user device 110 to request fetching and/or refreshing of the payment codes stored in the user device 110. The user 105 also may perform particular gestures using the user device 110, such as by shaking the user device 110, making a particular gesture on a touch screen of the user device, bumping the user device in a certain pattern, voice command, and the like to request for the fetching and/or refreshing of the payment codes stored at the user device 110.

When the payment code fetch function is called, at step 304, the user device 110 may determine if the user 105 is still logged in at the payment application. For example, the user 105 may have previously logged into the payment application at the user device 110 by a user authentication process, such as by the user 105 entering a user ID and password, by fingerprint scanning, voice recognition, or the like. If the user 105 is actively operating the payment application, the user 105 may remain logged in. The payment application may automatically log the user 105 out after a particular period of inactivity in the payment application. As such, the user 105 may need to log in (or be authenticated) again.

In an embodiment, the user 105 may be logged in or remain logged in based on the user 105's location as detected by the user device 110. For example, if the user 105 is at home, the user device 110 may allow the user 105 to remain logged in indefinitely. If the user 105 is at a public space, the user 105 may be logged out after more than one minute of inactivity on the payment application. If the user 105 is no longer logged in, the process may end and no background caching of payment codes is implemented. In an embodiment, the user device 110 may request the user 105 to log in again if the user is no longer logged in.

If the user 105 is logged in at the payment application or logged into user 105's payment account, at step 306 the user device 110 or the payment provider server 170 may check the number of payment codes available at the user device 110. In an embodiment, the payment codes may be stored in the KEYCHAIN interface of APPLE's iOS. In particular, at step 308, the user device 110 or the payment provider server 170 may check to see if the number of payment codes is less than a certain amount (e.g., five payment codes). If the number of payment codes or the number of valid payment codes is not less than the certain amount, the process may return to the background fetch step. The user 105 may set and/or adjust the number of payment codes the user device 105 should store If the number of payment codes is less than the certain amount (e.g., less than five), the payment provider server 170 may generate one or more new payment codes for the user 105 at step 310. For example, the number of payment codes may be reduced due to expiration or the payment codes may be used up by the user 105 to make payments. The system may generate enough number of payment codes to make up for the missing payment codes. The payment codes may be generated at the payment service provider and communicated to the user device 110. The process of payment codes generation may be similar to the above-described step 206 in FIGS. 2 and 11. If the payment codes are generated successfully at step 312, the generated payment codes may be communicated from the payment provider server 170 to the user device 110. The user device 110 may store or cache the payment codes for future use at step 314. For example, the payment codes may be stored with the KEYCHAIN interface in APPLE's iOS.

Figure 6:
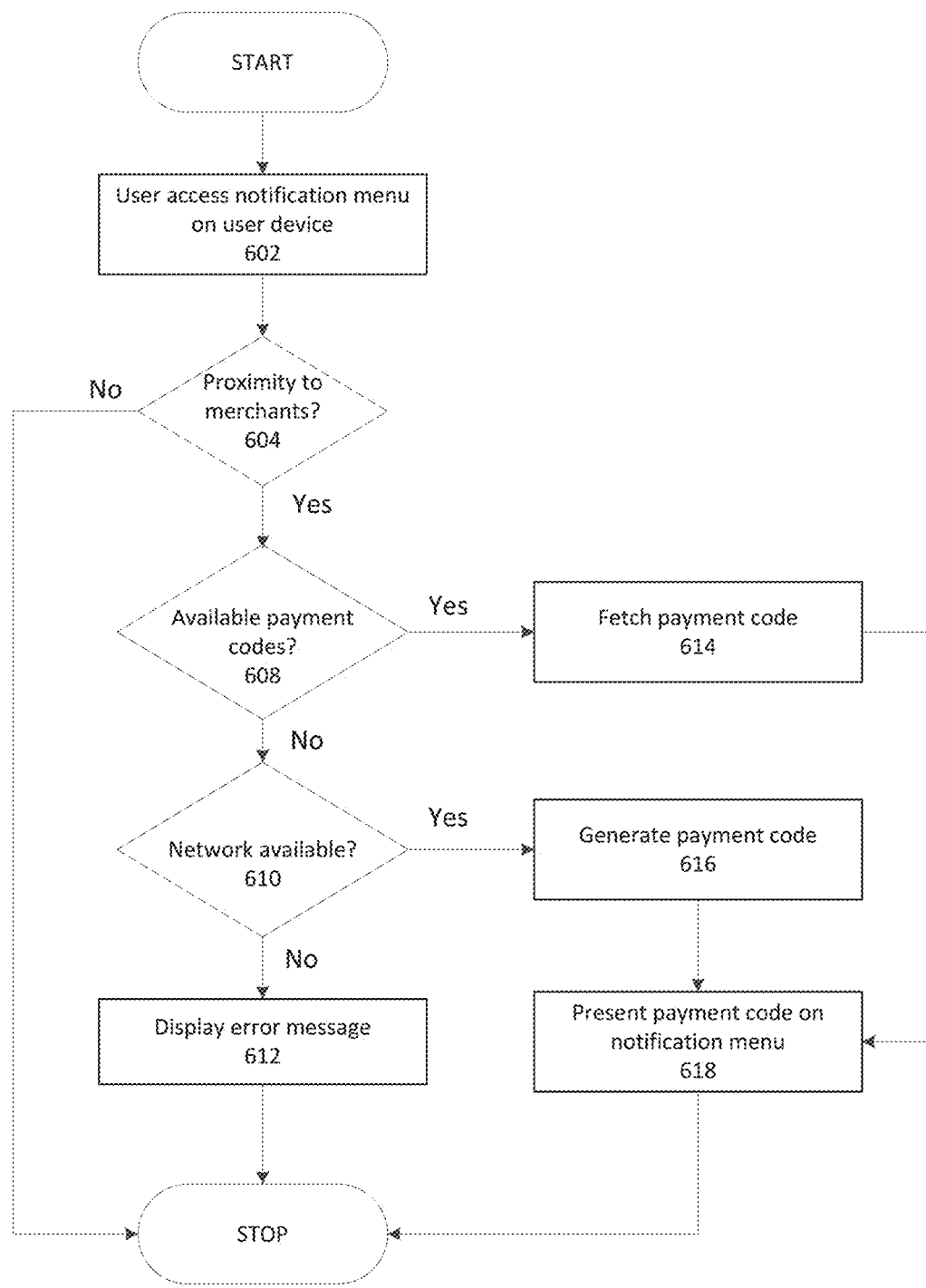
FIG. 6 illustrates a flowchart for a process of using a payment code on a pull down menu according to an embodiment.

FIG. 6 illustrates a flowchart for a process 600 of using a payment code on a notification menu according to an embodiment. The process may start with the user 105 accessing the payment function at step 602. For example, the user 105 may pull down a notification center on an iOS device. As shown in FIG. 9, a pull down menu of a notification center may include a payment section, e.g., PayPal section. The payment section may include icons for Fast Pay, Account, and Transfer. The Fast Pay icon may be operated or selected by the user 105 to access payment codes.

In other embodiments, the user 105 may start a payment application or implement different operations to activate the payment function. At step 604, the system then may determine whether the user 105 is in proximity to a merchant. For example, the system may determine, based on a location detection device, such as through GPS or Bluetooth Low Energy (BLE), whether the user device 110 is within 100 feet from a participating merchant. A participating merchant may be a merchant that signed up and agreed to accept payment codes issued from the payment service provider as payments at the merchant's POS. If the user device 110 is not within a certain distance from a participating merchant, the process may end.

If the user device 110 is within the certain distance from a participating merchant, at step 608, the system may determine if the user device 110 has valid and/or available payment codes, such as in the KEYCHAIN of iOS. If so, the user device 110 may fetch a valid payment code, e.g., from the KEYCHAIN of iOS, at step 614 and present the payment code to the user 105 on the pull-down menu at step 618, such as in the notification center menu on iOS. The payment code may be displayed as a QR code, a bar code, a numeric or character string, or the like, as shown in FIG. 10.

If the user device 110 does not have any valid payment codes, at step 610, the system may determine whether the user device 110 has network connection to the payment service provider, such as internet connection or cellular connection. If so, the user device 110 may request payment codes from the payment provider server 170 and the payment provider server 170 may generate and issue new payment codes to the user device 110 at step 616. The payment codes then may be presented to the user 105 at step 618, as shown in FIG. 10.

The merchant may scan the payment code to initiate the payment process. The payment code may then be sent from the merchant back to the payment provider server 170 to be verified. If the payment code is verified, the payment provider server 170 may process payment from the user 105 to the merchant. If there is no network connection at the user device 110 at step 610 and the user device 110 does not have available payment codes at step 608, the system may issue an error message or other notification to the user 105 at step 612. The error message or notification may include the cause or reason for the error, such as payment codes expired or network error. The notification or error message also may suggest other methods of payment, such as by cash, credit card, or the like.

Figure 5:
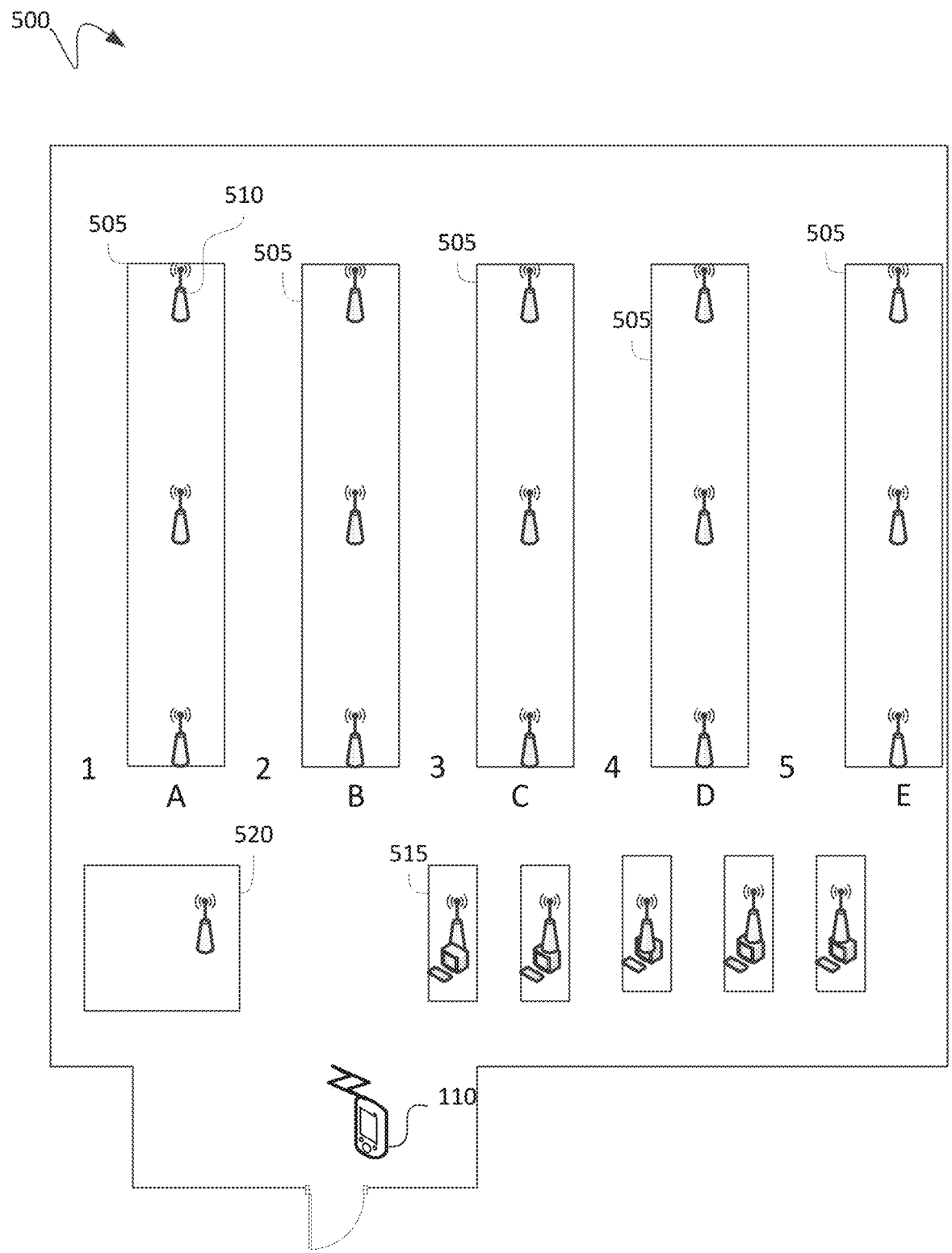
FIG. 5 is a diagram depicting a floor layout of a merchant store according to one embodiment.

In some embodiments, BLE beacons may be used to track the user 105's movement inside the merchant's store, as shown in FIG. 5. The store layout of a grocery merchant may include shelves 505. Each shelf 505 in the store may have three Bluetooth beacons 510: one at the front section, one at the middle section, and one at the rear section, although any number of suitable BLE beacons may be used. Each checkout counter 515 also may have a Bluetooth beacon 510. Further, one Bluetooth beacon 510 may be installed at a customer service counter 520 near the entrance of the store. The network of Bluetooth beacons 510 may be connected to merchant device 140. Each Bluetooth beacon 510 may emit a low energy Bluetooth signal with specific frequency spectrum. User 105 may carry a user device 110 including a Bluetooth device configured to communicate via low energy Bluetooth communication. When user 105 enters the merchant's store, user device 110 may detect Bluetooth beacons 510 installed near the store's entrance, such as the Bluetooth beacon 510 at customer service counter 520 and the Bluetooth beacon 510 at a checkout counter 515. Thus, the position of user device 110 may be determined based on which Bluetooth signals are received and the respective signal strength of the signals. The user device 110 may detect that the user 105 is approaching a check-out counter 515 and may begin the process of fetching and/or presenting a payment code to the user 105.

Figure 7:
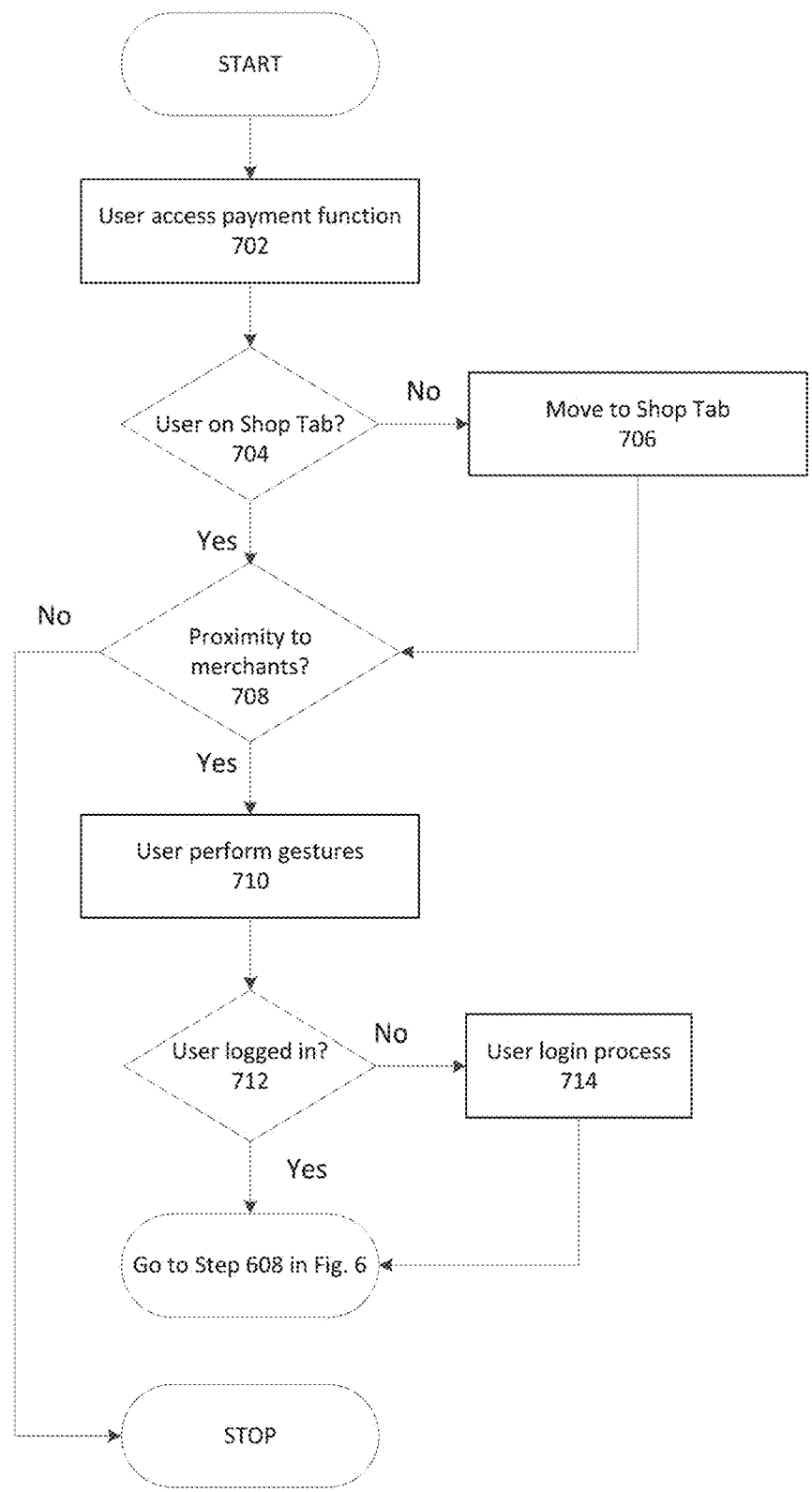
FIG. 7 illustrates a flowchart of a process of fetching payment codes by a user's gesture according to an embodiment.

FIG. 7 illustrates a flowchart of a process 700 of fetching payment codes by a user's gestures according to an embodiment. The process 700 may start at step 702 with the user 105 opening or launching a payment application on the user device 110, such as a PayPal app. The system may then check whether the user 105 is on the shopping tab of the shopping application at step 704. If not, the system may move to the shopping tab or shopping view from other views, such as account view or other application screens at step 706.

At step 708, the system then may determine whether the user 105 is within a certain distance from a participating merchant. For example, the system may determine, based on location detection device, such as GPS or Bluetooth Low Energy (BLE), whether the user device 110 is within 100 feet from a participating merchant. A participating merchant may be a merchant that signed up and agreed to accept payment codes issued from the payment service provider as payments at the merchant's POS. If the user device 110 is not within a certain distance from a participating merchant, the process may end.

At step 710, the user 105 may perform a gesture using the user device 110, such as shaking the user device 110. In some embodiments, the user gesture includes finger tracing or tapping on a touch screen of the user device 110. In other embodiments, the user gesture may make gestures on a wearable device connected to the user device 110, such as a smart watch or a wrist band. The user device 110 or the wearable device may detect the user 105's gesture by an accelerometer or a gyroscope.

In response to the gesture, the system then may check if the user 105 is logged in at step 710. If not, the system may request that the user 105 log in by entering user's credentials, such as a user name and password or touch ID. Other authentication process also may be used, such as fingerprint scanning, voice recognition, or the like. If the log in is successful, the process may proceed to step 608 in FIG. 6, in which the system may check to see if the user device 110 has valid payment codes available, such as in KEYCHAIN. If so, the user device 110 may fetch a valid payment code, e.g., from the KEYCHAIN of iOS, at step 614 and present the payment code to the user 105 on the pull-down menu at step 618, such as in the notification center menu on iOS. The payment code may be displayed as a QR code, a bar code, a numeric or character string, or the like, as shown in FIG. 10.

If the user device 110 does not have any valid payment codes, at step 610, the system may determine whether the user device 110 has network connection to the payment service provider, such as internet connection or cellular connection. If so, the user device 110 may request payment codes from the payment provider server 170 and the payment provider server 170 may generate and issue new payment codes to the user device 110 at step 616. The payment codes then may be presented to the user 105 at step 618, as shown in FIG. 10.

The merchant may scan the payment code to initiate the payment process. The payment code may then be sent from the merchant back to the payment provider server 170 to be verified. If the payment code is verified, the payment provider server 170 may process payment from the user 105 to the merchant. If there is no network connection at the user device 110 at step 610 and the user device 110 does not have available payment codes at step 608, the system may issue an error message or a notification to the user 105 at step 612. The error message or notification may include the cause or reason for the error, such as payment codes expired or network error. The notification or error message also may suggest other methods of payment, such as by cash, credit card, or the like.

Figure 8:
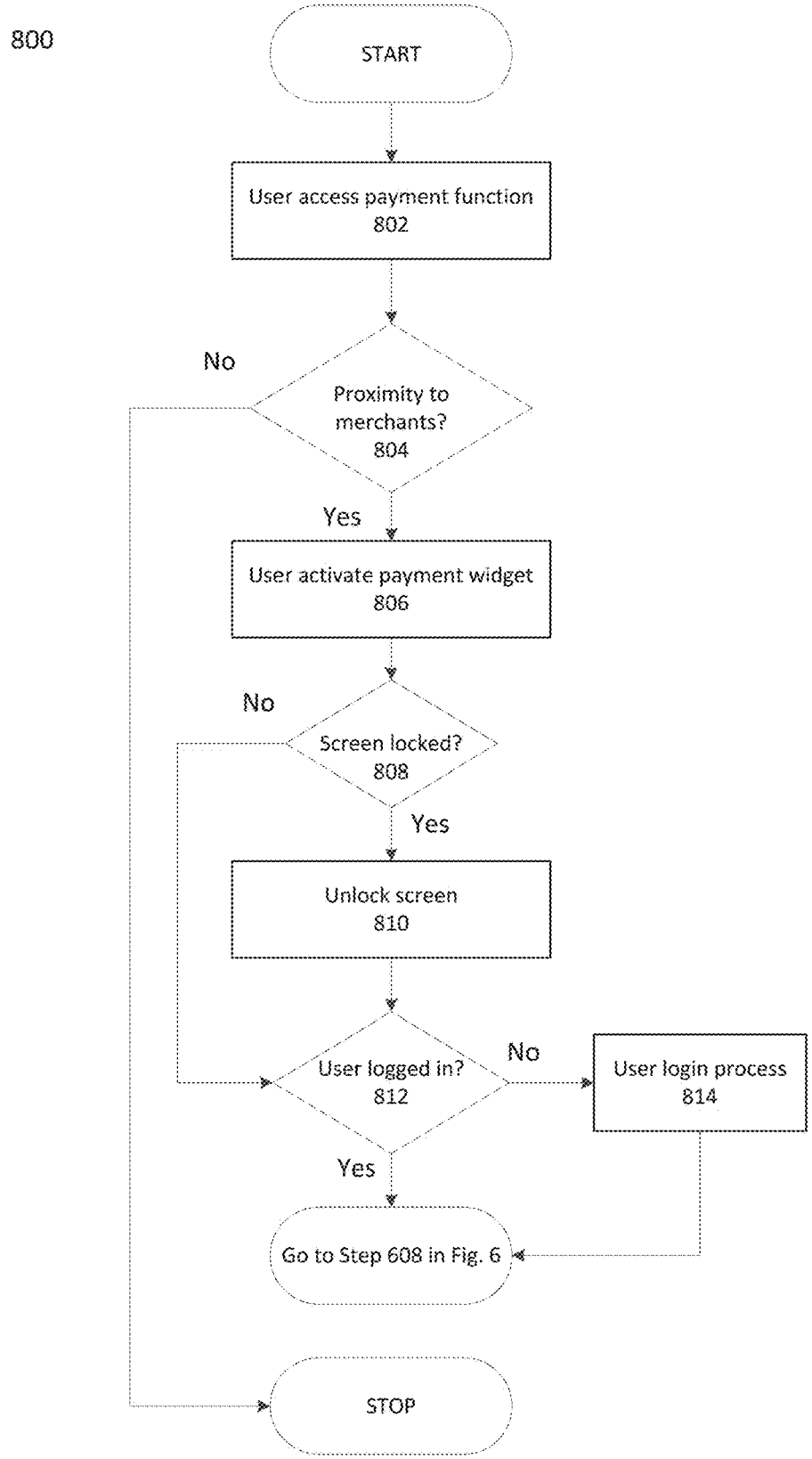
FIG. 8 illustrates a flowchart for a process of payment widget according to an embodiment.

FIG. 8 illustrates a flowchart for a process 800 of implementing a payment widget based on location according to an embodiment. The process may start with the user 105 accessing a payment function at step 802. For example, the user 105 may access a pull-down menu, such as a notification center of APPLE's iOS operating system. At step 804, the system may determine whether the user 105 is within a certain distance from a participating merchant location. For example, the system may determine, based on location detection device, such as through GPS or Bluetooth Low Energy (BLE), whether the user device 110 is within 100 feet from a participating merchant. A participating merchant may be a merchant that signed up and agreed to accept payment codes issued from the payment service provider as payments at the merchant's POS. If the user device 110 is not within a certain distance from a participating merchant, the process may end.

At step 806, the user 105 may find and activate a payment widget, such as a PayPal widget and may click on a "Pay Fast" button. At step 808, the system may determine whether the user device 110 is locked. For example, in a mobile operating system, the user 105 may have access to a notification menu, such as the pull-down notification center on APPLE's iOS, even when the user device 110 is locked and the user 105 has no substantial access to the other applications. If the user device 110 is locked (a locked screen), the user 105 may enter user credentials, such as a user name and/or password or touch ID to log into or unlock the user device 110 at step 810. In some embodiments, other user authentication methods may be used, such as fingerprint scanning, voice recognition, or the like.

At step 812, the system may determine whether the user 105 is logged in or authenticated for payment. If the user 105 is logged out, the system may authenticate the user 105 to log the user 105 into the payment application, such as by the user 105 entering a user name and/or password at step 814. In some embodiments, other user authentication methods may be used, such as fingerprint scanning, voice recognition, or the like.

If the log in is successful, the process may proceed to step 608 in FIG. 6, in which the system may check to see if the user device 110 has valid payment codes available, such as in KEYCHAIN. If so, the user device 110 may fetch a valid payment code, e.g., from the KEYCHAIN of iOS, at step 614 and present the payment code to the user 105 on the pull-down menu at step 618, such as in the notification center menu on iOS. The payment code may be displayed as a QR code, a bar code, a numeric or character string, or the like, as shown in FIG. 10.

If the user device 110 does not have any valid payment codes, at step 610, the system may determine whether the user device 110 has network connection to the payment service provider, such as internet connection or cellular connection. If so, the user device 110 may request payment codes from the payment provider server 170 and the payment provider server 170 may generate and issue new payment codes to the user device 110 at step 616. The payment codes then may be presented to the user 105 at step 618, as shown in FIG. 10.

The merchant may scan the payment code to initiate the payment process. The payment code may then be sent from the merchant back to the payment provider server 170 to be verified. If the payment code is verified, the payment provider server 170 may process payment from the user 105 to the merchant. If there is no network connection at the user device 110 at step 610 and the user device 110 does not have available payment codes at step 608, the system may issue an error message or a notification to the user 105 at step 612. The error message or notification may include the cause or reason for the error, such as payment codes expired or network error. The notification or error message also may suggest other methods of payment, such as by cash, credit card, or the like.

Accordingly, the system may provide different options for the user 105 to access the payment codes stored in the user device 110. In process 300, the system may automatically generate, refresh, and/or cache payment codes at various conditions in order that the payment codes may be ready for the user 105's use. For example, the payment codes may be generated/refreshed based on the user 105's location and/or movement, such as relative to a location of a participating merchant. In another example, the payment codes may be generated/refreshed based on the user device 110's network connection status. In still another example, the payment codes may be generated/refreshed upon the user 105's request, such as by accessing a mobile payment app on the user device 110 or performing certain gestures using the user device 110. In process 600, the user 105 may access the payment codes by a notification menu of the user device 110. In process 700, the user 105 may access the payment codes by certain user gestures. In process 800, the user 105 may access the payment codes by a payment widget at the user device 110.

Figure 4:
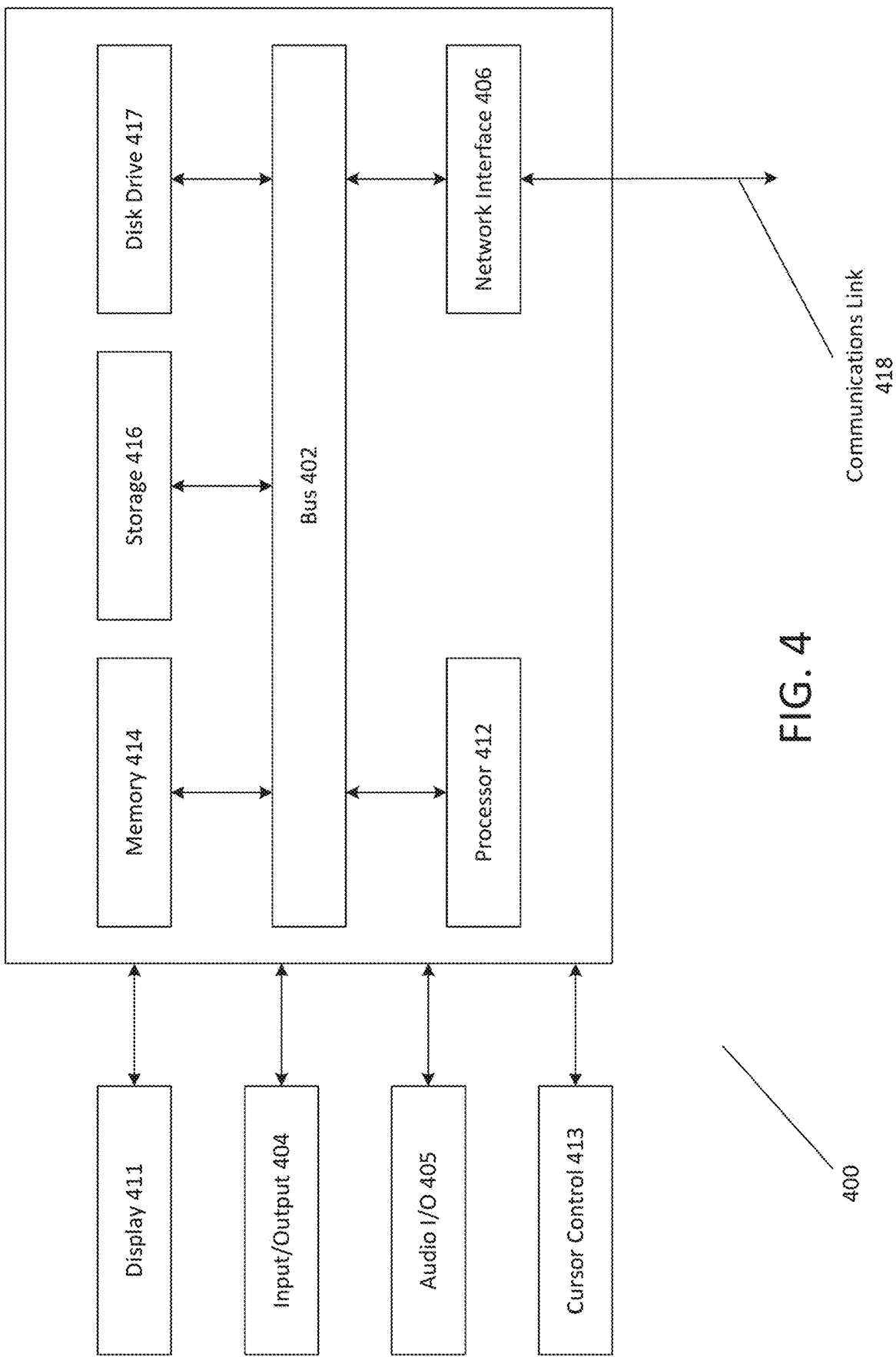
FIG. 4 is a block diagram of a computer system suitable for implementing one or more components in FIG. 1 according to one embodiment.

FIG. 4 is a block diagram of a computer system 400 suitable for implementing one or more embodiments of the present disclosure. In various implementations, the user device may comprise a personal computing device (e.g., smart phone, a computing tablet, a personal computer, laptop, PDA, Bluetooth device, key FOB, badge, etc.) capable of communicating with the network. The merchant and/or payment provider may utilize a network computing device (e.g., a network server) capable of communicating with the network. It should be appreciated that each of the devices utilized by users, merchants, and payment providers may be implemented as computer system 400 in a manner as follows.

Computer system 400 includes a bus 402 or other communication mechanism for communicating information data, signals, and information between various components of computer system 400. Components include an input/output (I/O) component 404 that processes a user action, such as selecting keys from a keypad/keyboard, selecting one or more buttons or links, etc., and sends a corresponding signal to bus 402. I/O component 404 may also include an output component, such as a display 411 and a cursor control 413 (such as a keyboard, keypad, mouse, etc.). An optional audio input/output component 405 may also be included to allow a user to use voice for inputting information by converting audio signals. Audio I/O component 405 may allow the user to hear audio. A transceiver or network interface 406 transmits and receives signals between computer system 400 and other devices, such as another user device, a merchant server, or a payment provider server via network 160. In one embodiment, the transmission is wireless, although other transmission mediums and methods may also be suitable. A processor 412, which can be a microcontroller, digital signal processor (DSP), or other processing component, processes these various signals, such as for display on computer system 400 or transmission to other devices via a communication link 418. Processor 412 may also control transmission of information, such as cookies or IP addresses, to other devices.

Components of computer system 400 also include a system memory component 414 (e.g., RAM), a static storage component 416 (e.g., ROM), and/or a disk drive 417. Computer system 400 performs specific operations by processor 412 and other components by executing one or more sequences of instructions contained in system memory component 414. Logic may be encoded in a computer readable medium, which may refer to any medium that participates in providing instructions to processor 412 for execution. Such a medium may take many forms, including but not limited to, non-volatile media, volatile media, and transmission media. In various implementations, non-volatile media includes optical or magnetic disks, volatile media includes dynamic memory, such as system memory component 414, and transmission media includes coaxial cables, copper wire, and fiber optics, including wires that comprise bus 402. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 400. In various other embodiments of the present disclosure, a plurality of computer systems 400 coupled by communication link 418 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/ or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A mobile computing system, comprising:
   one or more hardware processors; and
   a non-transitory computer-readable medium having stored thereon instructions that are executable to cause the system to perform operations comprising:
      determining that a number of valid revocable transaction codes stored on the mobile computing system is below a threshold;
      in response to determining that the number of valid revocable transaction codes is below the threshold, performing a background fetch operation for obtaining a first revocable transaction code via a network from a transaction processing system, wherein the first revocable transaction code includes encoded information identifying a transaction account corresponding to a user associated with the mobile computing system;
      caching the first revocable transaction code on the mobile computing system without providing the user access to the first revocable transaction code; and
      in response to determining that the mobile computing system is within a particular distance from a particular merchant location, providing the user access to the first revocable transaction code.

2. The mobile computing system of claim 1, wherein the providing the user access to the first revocable transaction code comprises displaying the first revocable transaction code optically, via a display device of the mobile computing system.

3. The mobile computing system of claim 1, wherein the performing the background fetch operation comprises:
   transmitting a transaction code request to the transaction processing system via a representational state transfer (REST) application programming interface (API), wherein the first revocable transaction code is received in response to the transaction code request.

4. The mobile computing system of claim 1, wherein the operations further comprise:
   responsive to a triggering event detected by the mobile computing system, causing the first revocable transaction code to be transmitted to the transaction processing system.

5. The mobile computing system of claim 1, wherein the operations further comprise:
   receiving a plurality of revocable transaction codes including the first revocable transaction code, wherein each of the plurality of revocable transaction codes is usable to conduct a transaction at one or more corresponding merchants; and
   invalidating a second revocable transaction code of the plurality of revocable transaction codes based on at least one of a detection that the mobile computing system is stolen, a determination that an expiration time for the second revocable transaction code is reached, or a determination that a number of unsuccessful login attempts occurring at the mobile computing system has exceeded a threshold number.

6. The mobile computing system of claim 1, wherein the access to the first revocable transaction code is provided to the user further based on the user performing a particular physical gesture with the mobile computing system.

7. The mobile computing system of claim 4, wherein the triggering event includes the mobile computing system being located within the particular merchant location.

8. A method, comprising:
   determining, by a mobile computing system, that a number of valid revocable transaction codes stored on the mobile computing system is below a threshold;
   based on the number of valid revocable transaction codes being below the threshold, performing, by the mobile computing system, a background fetch operation for obtaining a first revocable transaction code via a network from a transaction processing system, wherein the first revocable transaction code includes encoded information identifying a transaction account corresponding to a user associated with the mobile computing system;
   storing the first revocable transaction code on the mobile computing system without providing the user access to the first revocable transaction code;
   responsive to a first triggering event detected by in response to determining that the mobile computing system is within a particular distance from a particular merchant location, providing the user access to the first revocable transaction code; and
   causing the first revocable transaction code to be transmitted to the transacting processing system.

9. The method of claim 8, wherein the mobile computing system is not connected to a mobile cellular data network when the first revocable transaction code is caused to be transmitted to the transaction processing system.

10. The method of claim 8, wherein the causing the first revocable transaction code to be transmitted comprises outputting, via a speaker of the mobile computing system transmitting, the first revocable transaction code in an audio format.

11. The method of claim 8, further comprising determining that the mobile computing system is at a particular merchant location using a short-range wireless communication.

12. The method of claim 11, wherein the short-range wireless communication comprises a Bluetooth connection.

13. The method of claim 8, wherein the access to the first revocable transaction code is provided to the user further based on a particular time of day, and wherein the first revocable transaction code is a quick response (QR) code.

14. The method of claim 8, wherein the access to the revocable transaction code is provided to the user further based on a payment application being activated on the mobile computing system by the user.

15. The method of claim 14, wherein the access to the first revocable transaction code is provided to the user automatically in response to detecting that the payment application is activated without requiring any further input from the user.

16. A non-transitory computer readable medium having instructions stored thereon that are executable by a mobile computing system to cause the mobile computing system to perform operations comprising;
    determining that a number of valid revocable transaction codes stored on the mobile computing system is below a threshold;
    based on the number of valid revocable transaction codes being below the threshold, performing a background fetch operation for obtaining a first revocable transaction code via a network from a transaction processing system, wherein the revocable transaction code includes encoded information identifying a transaction account corresponding to a user associated with the mobile computing system;
    storing the first revocable transaction code on the mobile computing system without providing the user access to the first revocable transaction code;
    in response to determining that the mobile computing system is within a particular distance from a particular merchant location, providing the user access to the first revocable transaction code; and
    causing the first revocable transaction code to be transmitted to the transacting processing system.

17. The non-transitory computer readable medium of claim 16, wherein the performing the background fetch operation comprise:
    transmitting a transaction code request to the transaction processing system via an application programming interface (API), wherein the first revocable transaction code is received in response to the transaction code request.

18. The non-transitory computer readable medium of claim 16, wherein the first revocable transaction code is caused to be transmitted to the transacting processing system via a short-range wireless connection.

19. The non-transitory computer readable medium of claim 16, wherein the providing the user access to the first revocable transaction code comprises displaying the first revocable transaction code optically, via a display device of the mobile computing system.

20. The non-transitory computer readable medium of claim 16, wherein the access to the first revocable transaction code is provided to the user further based on the user performing a particular physical gesture with the mobile computing system.

\* \* \* \* \*